United States Patent [19]

Ansel et al.

[11] 4,183,796

[45] Jan. 15, 1980

[54] RADIATION CURABLE OLIGOMERS BASED ON TRIS(2-HYDROXYETHYL) ISOCYANURATE

[75] Inventors: Robert E. Ansel, Hoffman Estates; John C. Graham, Palatine, both of Ill.

[73] Assignee: DeSoto, Inc., Des Plaines, Ill.

[21] Appl. No.: 876,497

[22] Filed: Feb. 9, 1978

[51] Int. Cl.$^2$ ............................ C08F 2/50; C08F 4/00
[52] U.S. Cl. ............................ 204/159.23; 428/522; 526/261; 544/222
[58] Field of Search ............ 204/159.23; 544/222; 526/261

[56] References Cited

U.S. PATENT DOCUMENTS

| | | | |
|---|---|---|---|
| 3,345,429 | 10/1967 | Sattler | 528/272 |
| 3,509,234 | 4/1970 | Burlant et al. | 204/159.16 |
| 3,658,801 | 4/1972 | Berry et al. | 526/261 |
| 3,783,150 | 1/1974 | Koyler et al. | 544/222 |
| 3,989,609 | 11/1976 | Brack | 204/159.15 |

*Primary Examiner*—Walter C. Danison
*Attorney, Agent, or Firm*—Dressler, Goldsmith, Clement, Gordon & Shore, Ltd.

[57] ABSTRACT

A radiation curable oligomer which cures to provide a combination of improved elongation and tensile strength is constituted by a selected hydroxy functional polyester having its active hydrogen atoms end-capped by reaction with ethylenically unsaturated monoisocyanate. This polyester is the reaction product of one mole of tris (2-hydroxyethyl) isocyanurate with three moles of saturated dicarboxylic acid and three moles of diol, these proportions being variable within the limits of ±20%, the polyester reaction product having an acid value of less than 20, preferably less than 5, and providing hydroxyl-terminated branches having an average length corresponding to a calculated molecular weight of 100–1500.

14 Claims, No Drawings

RADIATION CURABLE OLIGOMERS BASED ON TRIS(2-HYDROXYETHYL) ISOCYANURATE

The present invention relates to radiation curable oligomers in which an hydroxyl-functional polyester based on tris(2-hydroxyethyl)isocyanurate is capped with ethylenically unsaturated urethane moieties so that cured films containing the oligomers are characterized by improved elongation and tensile strength. The coating of flexible vinyl floor tile is particularly contemplated.

In accordance with this invention, a radiation curable ologomer is constituted by a selected hydroxy functional polyester having its active hydrogen atoms end-capped by reaction with ethylenically unsaturated monoisocyanate. This polyester in the reaction product of one mole of tris(2-hydroxyethyl)isocyanurate with three moles of saturated dicarboxylic acid and three moles of diol, these proportions being variable within the limits of ±20%, the polyester reaction product having an acid value of less than 20 and providing hydroxyl-terminated branches having an average length corresponding to a calculated molecular weight of 100–1500. The polyester provides a polyfunctional branched resinous product based on tris(2-hydroxyethyl)isocyanurate which is terminated by a small number of reactive hydrogen atoms, and these are end-capped by reaction with an ethylenically unsaturated monoisocyanate to provide a branched resinous polyurethane in which several branches of controlled length extend from an isocyanurate ring, there being a terminal radiation curable ethylenic group carried on the end of these branches.

It will be understood that the hydroxy group in the isocyanate is a primary hydroxy group and, is hence in the 2-position.

Upon radiation cure of coatings based on the branched resinous polyethylenic polyurethanes of this invention, it is found that the capacity of the cured film to sustain elongation is greatly improved and its tensile strength is greatly increased in comparison with similar structures which are not branched or in which the branches do not extend from an isocyanurate ring, as in U.S. Pat. No. 3,989,609 in which a polyether triol is used to support the terminal ethylenic groups.

The polyester can be formed in one or several stages as desired and the polyesterification reaction is conveniently carried out under a nitrogen blanket at a temperature of 200°–250° C. using dibutyl tin oxide as catalyst, though the reaction is itself conventional. The polyester will preferably have a hydroxyl value in the range of 40–200, more preferably 150–180.

It is convenient to prereact a diisocyanate with a monoethylenic monohydroxy compound, such as hydroxy ethyl acrylate or methacrylate, and then to react the unsaturated monoisocyanate so-provided with the preferred polyester, but instead, excess diisocyanate can be reacted with the polyester, and then with the monoethylenic compound noted. The former procedure is preferred.

It is desired to stress that it is unusual to obtain physical strength and elongation capacity at the same time, and this is a feature of the invention which critically requires the employment of tris(2-hydroxyethyl)isocyanurate and the production of a polyester therefrom using both saturated dicarboxylic acid and diol to provide the plural branches and the chain length in each branch which are needed.

Many saturated dicarboxylic acids can be used in this invention, such as adipic acid, azelaic acid, dimer fatty acids in which the residual unsaturation is ignored as insignificant, malonic acid, succinic acid, sebacic acid, phthalic acid, and the like. The two carboxyl groups are the only reactive groups present, the term "reactive," as is common in the art, having reference to the conditions used to form and cure the resin. The two acid groups may be coupled as an anhydride, e.g., as is phthalic anhydride. The preferred dicarboxylic acids are straight chain aliphatic diacids having from 4–10 carbon atoms, most preferably adipic acid or azelaic acid.

The diols which are used contain the two hydroxy groups as the sole reactive groups, and these diols may be of diverse type. These may be illustrated by 1,6-hexane diol (which is preferred) or any isomer thereof, 1,4-butane diol, ethylene glycol, polyethylene glycol (typically with a calculated molecular weight of from 150–1500), and polypropylene and polybutylene glycols having the same range of molecular weight. Polypropylene glycol of molecular weight 425 and polybutylene glycol of molecular weight 1200 are illustrative.

The hydroxy functional isocyanurate-based polyesters which are used herein will range from viscous liquids to solids at room temperature, but they typically have the form of a waxy semi-solid.

The end-capping of hydroxyl-terminated soluble resins with ethylenically unsaturated monoisocyanates either by stepwise reaction with a diisocyanate (1 mol per hydroxyl equivalent) followed by reaction with an ethylenically unsaturated alcohol or by reaction with a monoethylenic monoisocyanate, are both well known. These alternative procedures are both embraced by this invention, though the latter procedure is preferred. Reference is here made to U.S. Pat. Nos. 3,509,234 and 3,989,609 which stress the less preferred reaction procedure.

Various organic diisocyanates are useful herein, such as the commercial toluene diisocyanate mixture, 1,6-hexamethylene diisocyanate, p,p'-diphenylmethane diisocyanate, dimeryl diisocyanate, 4,4'-dicylohexylmethane diisocyanate, and the like, but when using the preferred reaction procedure of this invention, the use of 2,4-toluene diisocyanate is preferred since one of the isocyanate groups is far more reactive than the other which assists in the formation of a monoethylenic monoisocyanate. Isophorone diisocyanate is also preferred.

The diisocyanate is reacted with a molar proportion of a monoethylenically unsaturated polymerizable monomer carrying an active hydrogen atom reactive with the isocyanate group. Thus, such monomers as acrylic acid, acrylamide, N-methylol acrylamide are similar monoethylenic monomers are broadly useful, but the hydroxy group is the preferred group for supplying the active hydrogen atom. Thus, allyl alcohol, methallyl alcohol, norbornenyl alcohol and hydroxyethyl methacrylate are all useful, but since an ultraviolet cure is preferred, an hydroxy alkyl acrylate, especially hydroxy ethyl acrylate, is most beneficial. Hydroxy propyl acrylate and hydroxy butyl acrylate are also useful.

The reaction with isocyanate is itself well known and goes easily and quickly at moderate temperature of from 20° C.–80° C., and it may be catalyzed, as is well known, or it may be uncatalyzed, as desired. Temperature as low as 0° C. can be used.

The polyethylenically unsaturated isocyanurate-based oligomers of this invention may be used together with ethylenically unsaturated liquids which serve as diluents. These are illustrated by 2-hydroxyethyl acrylate, phenoxy ethyl acrylate, isobornyl acrylate, styrene, vinyl pyrollidone, and the like. These diluents are desirably used in an amount of from 10% based on the total weight of polymerizable material (capped oligomer+reactive diluent). Preferred proportions on the same basis are from 20% to 40%. Polyethylenic materials such as polyacrylates illustrated by trimethylol propane triacrylate, may be present in small amount (up to about 5%), but it is preferred to use monoethylenic diluents in order to preserve the distance between crosslinking sites and thereby maintain the combination of strength and elongation which is unique herein.

Photosensitizers (also referred to as photoinitiators) are optional herein, and various known materials are useful, primarily the ketonic photosensitizers such as benzophenone, diethoxy acetophenone and benzoin ethers, such as isobutyl benzoin ether. Amines, such as diethyl amine may also be added to enhance the ultraviolet cure.

While the ultraviolet light cure is preferred, this term embracing visible light near the ultraviolet range, radiation of diverse type from beta radiation to electron beam can be used, all as is well known.

EXAMPLE 1

Synthesis of An Illustrative Polyester

One mole of tris(2-hydroxyethyl)isocyanurate; three moles of adipic acid; three moles of 1,6-hexane diol; and about 0.1% by weight of dibutyl tin oxide were charged to a suitable reaction flask and heated, under a nitrogen blanket, to 225° C. with evolution of water. After 6–8 hours, the required amount of water had been collected and the reaction was terminated. The product, a hydroxy-terminated polyester, had an acid number of less than 5.0 and the hydroxy number was about 165.

EXAMPLE 2

Synthesis of the Isocyanate Adduct

To one mole of the isophorone diisocyanate is added 0.2% by weight of hydroquinone, 0.4% by weight of dibutyl tine dilaurate and 0.04% by weight of phenothiazine. The resulting solution was blanketed with nitrogen and cooled to room temperature and one mole of hydroxyethyl acrylate was added dropwise so as to maintain the reaction temperature below 50° C. After approximately 2–4 hours, infrared analysis of the product did not show evidence of the hydroxyl group and the reaction was terminated by cooling.

EXAMPLE 3

Synthesis of the Photopolymerizable Oligomer

One mole of the polyester of Example 1 and 0.1% by weight of dibutyl tin dilaurate were charged to a reaction flask and heated to 60°–80° C. Three moles of the isocyanate adduct of Example 2 were then added, dropwise, and the reaction mixture was heated for 4 hours to complete the reaction.

EXAMPLE 4

Example 3 is repeated in the presence of a diluent to minimize viscosity. This is accomplished by adding 20% by weight of a liquid monoacrylate or polyacrylate to the polyester being reacted in Example 3. Suitable diluents which can be used are illustrated by phenoxyethyl acrylate, isoborneal acrylate, vinyl pyrollidone, and triethylene glycol diacrylate. Correspondingly, the diluent can be added after the reaction is completed.

The final product is curable with ionizing radiation, but if ultraviolet cure is desired, then a suitable photosensitizer, such as a ketonic photosensitizer illustrated by benzophenone, can be added whereupon the compositions will cure with light in or near the ultraviolet region of the spectrum (about 200–400 nanometers).

Numerous systems have been produced and tested, and typical results are presented in the Table which follows in which the abreviations listed below are used:
THEIC=tris(2-hydroxyethyl)isocyanurate
HD=1,6-hexane diol
AZ=azaleic acid
DEG=diethylene glycol
BP=benzophenone
POEA=phenoxyethyl acrylate
DA=dimer fatty acid
IPDI-HEA=isophorone-diisocyanate-2-hydroxyethyl acrylate adduct (1:1 mole ratio)
DEA=diethyl amine
DEAP=diethoxy acetophenone
V-P=vinyl pyrollidone
TEGDA=triethylene glycol diacrylate In the tests, the composition was applied to glass, cured with ultraviolet light, and then stripped for testing. The cure was carried out using mercury vapor lamps at 400 watts per inch with the coated samples being passed beneath the focused lamps at a speed of 20 feet per minute.

TABLE

| Oligomer | Adduct | Sensitizer | Diluent | Tensile (psi) | Percent Elongation | Tensile Modulus (psi) | Rupture (lbs/in$^3$) | Thickness (mils) |
|---|---|---|---|---|---|---|---|---|
| THEIC/AD/HD (1:3:3) | IPDI-HEA | 0.5% DEA 3% BP | 20% TEGDA | 2615 | 45 | 14,200 | 1689 | 4.9 |
| THEIC/AD/HD (1:3:3) | IPDI-HEA | 0.5% DEA 3% BP | 20% V-P | 2649 | 69 | 13,150 | 2477 | 3.4 |
| THEIC/DA/HD (1:3:3) | IPDI-HEA | 3% BP 0.5% DEA | 20% V-P | 1900 | 87 | 7,950 | 2165 | 4.7 |
| THEIC/DA/HD (1:3:3) | IPDI-HEA | 3% DEAP | 20% V-P | 2224 | 78 | 13,883 | 2487 | 5.0 |
| THEIC/DA/AZ/DEG (1:1:2:3) | IPDI-HEA | 1% DEAP | 20% V-P | 2758 | 68 | 20,700 | 2880 | 4.3 |
| THEIC/DA/AZ/DEG (1:1:2:3) | IPDI-HEA | 3% DEAP | 20% V-P | 3782 | 92 | 24,100 | 4757 | 2.9 |
| THEIC/DA/AZ/DEG (1:1:2:3) | IPDI-HEA | 3% DEAP | 20% V-P | 2686 | 64 | 21,800 | 2722 | 2.9 |
| THEIC/DA/AZ/DEG (1:1:2:3) | IPDI-HEA | 5% DEAP | 20% V-P | 2919 | 84 | 17,500 | 3423 | 3.4 |

TABLE-continued

| Oligomer | Adduct | Sensitizer | Diluent | Tensile (psi) | Percent Elongation | Tensile Modulus (psi) | Rupture (lbs/in³) | Thickness (mils) |
|---|---|---|---|---|---|---|---|---|
| THEIC/DA/AZ/DEG (1:1:2:3) | IPDI-HEA | 3% DEAP | 20% V-P | 3086 | 83 | 21,100 | 3734 | 4.0 |
| THEIC/DA/AZ/DEG (1:1:2:3) | IPDI-HEA | 1% DEAP | 20% V-P | 4620 | 77 | 39,667 | 5772 | 4.1 |
| THEIC/DA/AZ/DEG (1:1:2:3) | IPDI-HEA | 3% DEAP | 20% V-P | 3874 | 55 | 34,880 | 3681 | 3.4 |
| THEIC/DA/AZ/DEG (1:1:2:3) | IPDI-HEA | 3% BP | 20% V-P | 1225 | 85 | 2,540 | 1112 | 3.6 |
| THEIC/DA/AZ/DEG (1:1:2:3) | IPDI-HEA | 0.5% DEA | 20% V-P | 1268 | 88 | 2,290 | 1200 | 3.2 |
| THEIC/DA/AZ/DEG (1:1:2:3) | IPDI-HEA | 0.5% DEA 1% BP | 20% V-P | 1269 | 86 | 2,540 | 1184 | 3.8 |
| THEIC/DA/AZ/DEG (1:1:2:3) | IPDI-HEA | 5% BP 0.5% DEA | 20% V-P | 1264 | 82 | 2,825 | 1152 | 2.6 |
| THEIC/AZ/DA/DEG (1:2:1:3) | IPDI-HEA | 3% DEAP | 20% TEGDA | 1846 | 66 | 4,933 | 1397 | 4.8 |
| THEIC/AZ/DEG (1:3:3) | IPDI-HEA | 3% BP 0.5% DEA | 20% V-P | 2353 | 91 | 4,767 | 2334 | 3.1 |
| THEIC/AZ/DEG (1:3:3) | IPDI-HEA | 3% DEAP | 20% V-P | 3738 | 92 | 15,417 | 4183 | 2.0 |
| THEIC/AZ/DEG (1:3:3) | IPDI-HEA | 3% BP 0.5% DEA | 20% TEGDA | 1048 | 55 | 1,500 | 596 | 3.7 |
| THEIC/AZ/DEG (1:3:3) | IPDI-HEA | 3% DEAP | 20% TEGDA | 3022 | 57 | 8,867 | 2025 | 2.3 |
| THEIC/AZ/HD (1:3:3) | IPDI-HEA | 3% BP 0.5% DEA | 20% V-P | 3001 | 80 | 15,900 | 3134 | 2.3 |
| THEIC/AZ/HD (1:3:3) | IPDI-HEA | 3% BP 0.1% DEA | 20% V-P | 2980 | 75 | 15,567 | 2963 | 2.1 |
| THEIC/AZ/HD (1:3:3) | IPDI-HEA | 3% BP 0.25% DEA | 20% V-P | 2605 | 90 | 6,733 | 2534 | 2.8 |
| THEIC/AZ/HD (1:3:3) | IPDI-HEA | 3% BP 0.5% DEA | 20% POEA | 2637 | 105 | 4,580 | 2462 | 2.4 |
| THEIC/AZ/HD (1:3:3) | IPDI-HEA | 3% DEAP | 20% POEA | 3108 | 97 | 7,333 | 3041 | |
| THEIC/AZ/HD (1:3:3) | IPDI-HEA | 3% DEAP | 20% POEA | 3800 | 103 | 14,000 | 4300 | |
| THEIC/AZ/HD (1:3:3) | IPDI-HEA | 3% DEAP | 20% POEA | 4000 | 98 | 20,000 | 4700 | |
| THEIC/DA/AD/HD (1:1:2:3) | IPDI-HEA | 3% DEAP | 20% V-P | 1852 | 98 | 9,567 | 2421 | 2.6 |
| THEIC/DA/AD/HD (1:1:2:3) | IPDI-HEA | 3% BP 0.5% DEA | 20% V-P | 1033 | 98 | 2,003 | 1129 | 3.1 |
| THEIC/DA/AD/HD (1:2:1:3) | IPDI-HEA | 3% DEAP | 20% V-P | 3140 | 68 | 28,000 | 3463 | 2.0 |
| THEIC/DA/AD/HD (1:2:1:3) | IPDI-HEA | 3% BP 0.5% DEA | 20% V-P | 2778 | 97 | 12,800 | 3494 | 2.3 |
| THEIC/AZ/HD (1:3:3) | IPDI-HEA | 3% DEAP | 30% POEA | 3073 | 110 | 4,067 | 2950 | 2.4 |

We claim:

1. A radiation curable oligomer constituted by an hydroxy functional polyester having its active hydrogen atoms end-capped by reaction with ethylenically unsaturated monoisocyanate, said polyester being the reaction product of one mole of tris(2-hydroxyethyl-)isocyanurate with three moles of saturated dicarboxylic acid and three moles of diol, these proportions being variable within the limits of ±20%, said polyester reaction product having an acid value of less than 20 and providing hydroxyl-terminated branches having an average length corresponding to a calculated molecular weight of 100-1500.

2. A radiation curable oligomer as recited in claim 1 in which the hydroxyl value of said polyester is in the range of 40-200.

3. A radiation curable oligomer as recited in claim 2 in which said ethylenically unsaturated monoisocyanate is formed by reacting 2-hydroxy alkyl acrylate or methacrylate with an organic diisocyanate.

4. A radiation curable oligomer as recited in claim 2 in which said saturated dicarboxylic acid is a straight chain aliphatic dicarboxylic acid having from 4-10 carbon atoms.

5. A radiation curable oligomer as recited in claim 4 in which said saturated dicarboxylic acid is selected from adipic acid and azelaic acid and the hydroxyl value of said polyester is in the range of 150-180.

6. A radiation curable oligomer as recited in claim 2 in which said diol is 1,6-hexane diol.

7. A radiation curable oligomer as recited in claim 3 in which said diisocyanate is 2,4-toluene diisocyanate.

8. A radiation curable oligomer as recited in claim 7 in which said toluene diisocyanate is reacted with 2-hydroxyethyl acrylate.

9. A radiation curable oligomer as recited in claim 1 which is a waxy semi-solid.

10. A radiation curable oligomer as recited in claim 1 in admixture with an ethylenically unsaturated liquid diluent, said diluent constituting from 10% to 60% of the total weight of polymerizable material.

11. A radiation curable mixture as recited in claim 10 in which the proportion of diluent is in the range of from 20%-40% of the total weight of polymerizable material.

12. A radiation curable oligomer as recited in claim 1 in admixture with a ketonic photosensitizer for ultraviolet light.

13. A radiation curable oligomer as recited in claim 3 in which said diisocyanate is isophorone diisocyanate.

14. A radiation curable oligomer as recited in claim 1 in which said polyester is formed by reacting one mole of tris(2-hydroxyethyl)isocyanurate with about three moles of saturated dicarboxylic acid and about three moles of diol, said reaction being continued to substantial completion as evidenced by an acid value of less than 20.

* * * * *